(12) United States Patent
Irwin et al.

(10) Patent No.: US 6,968,187 B1
(45) Date of Patent: Nov. 22, 2005

(54) MULTI-AIRPLANE CELLULAR COMMUNICATIONS SYSTEM

(75) Inventors: William George Carson Irwin, Scottsdale, AZ (US); Mark Melvin Kanne, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 539 days.

(21) Appl. No.: 10/070,846

(22) PCT Filed: Jun. 26, 2000

(86) PCT No.: PCT/US00/17578

§ 371 (c)(1),
(2), (4) Date: Mar. 11, 2002

(87) PCT Pub. No.: WO01/20814

PCT Pub. Date: Mar. 22, 2001

Related U.S. Application Data

(60) Provisional application No. 60/153,620, filed on Sep. 13, 1999.

(51) Int. Cl.$^7$ .............................................. H04Q 7/00

(52) U.S. Cl. ...................... 455/431; 455/436; 455/427; 455/13.1; 342/352

(58) Field of Search ................................ 455/427–428, 455/430–431, 436–439, 422.1, 432.1, 442–443, 455/10–13.4; 342/2, 352, 356–357; 701/213–214

(56) References Cited

U.S. PATENT DOCUMENTS

| | | | | |
|---|---|---|---|---|
| 6,018,659 A | * | 1/2000 | Ayyagari et al. | 455/431 |
| 6,044,323 A | * | 3/2000 | Yee et al. | 342/352 |
| 6,061,562 A | * | 5/2000 | Martin et al. | 455/427 |
| 6,507,739 B1 | * | 1/2003 | Gross et al. | 455/12.1 |
| 6,571,102 B1 | * | 5/2003 | Hogberg et al. | 455/436 |
| 6,642,894 B1 | * | 11/2003 | Gross et al. | 455/431 |
| 6,662,011 B1 | * | 12/2003 | Sale et al. | 455/436 |
| 6,675,013 B1 | * | 1/2004 | Gross et al. | 455/13.1 |
| 6,768,906 B2 | * | 7/2004 | Matthews et al. | 455/427 |

* cited by examiner

Primary Examiner—Emmanuel L. Moise
Assistant Examiner—Kamran Afshar
(74) Attorney, Agent, or Firm—Ingrassia Fisher & Lorenz, P.C.

(57) ABSTRACT

A communications link for a cellular communications system (10) includes a first airplane (35) for flying in a first pattern (86) and including a first antenna for transmitting RF beams (92) to form a first footprint (96) on a first target geographic area (98) to provide cellular phone users (18) within the footprint with a first communications link. A second airplane (35') flies in a second pattern (86) and includes a second antenna for transmitting RF beams (92) to form a second footprint (96) on a second target geographic area (98) to provide cellular phone users (18) within the second footprint with a second communications link. The first and second airplanes each fly at an altitude that is below a high altitude level and that is varied to enable continuous uninterrupted coverage to be provided to a service area below in a weather pattern-independent and geographic feature-independent manner.

24 Claims, 9 Drawing Sheets

MULTI-AIRPLANE CELLULAR COMMUNICATIONS SYSTEM

CROSS-REFERENCE TO RELATED APPLICATION

The present application is related to, and claims priority from, provisional patent application Ser. No. 60-153620, entitled Wireless AERO Solutions for Communications Networks, filed on Sep. 13, 1999, the contents of which are incorporated herein by reference.

FIELD OF THE INVENTION

The present invention relates generally to a cellular communications system including an airborne repeater, and particularly to such a system implemented by two airplanes.

BACKGROUND OF THE INVENTION

The increasing need for communications networks and capabilities in outlying and geographically diverse locations has created greater demand for cellular systems. Many new carriers providing the infrastructure for such systems have focused their resources on building as many terrestrial cell stations as possible to expand their respective areas of coverage and consequently generate more revenue.

However, the buildout rate for the terrestrial cell stations is typically slow and expensive, especially in mountainous or otherwise difficult to access areas. In addition, in some these areas, a carrier's return on investment may not provide the incentive necessary for the carrier to build the necessary cell stations, thereby leaving these areas with either limited or no cellular service at all. Further, many areas having a sufficient number of cellular communications base transceiving stations to handle calls during both off-peak and peak times cannot adequately handle large volumes of calls during sporting events or other short-term special events that temporarily attract large crowds.

In response to the above, airborne cellular systems have been proposed in which a cellular repeater mounted in an airplane, flying a predetermined flight pattern over a geographic area requiring cellular coverage, links calls from cellular phones within the covered geographic area to a terrestrial base station. Because the airplane is capable of traversing geographic limitations and takes the place of the cell stations, such a system overcomes the above-mentioned limitations of conventional terrestrial cellular systems.

Despite its many advantages, an airborne cellular system presents design and implementation considerations not present in the design and implementation of conventional terrestrial cellular systems. For example, an airborne system typically includes a single airplane carrying a cellular repeater. Therefore, when the plane encounters adverse weather conditions, its flight pattern, and therefore the coverage area of the repeater, must be altered. Currently proposed airborne systems utilize a high-altitude airplane that is capable of flying above adverse weather conditions. However, as such an airplane requires specially-trained pilots, special maintenance and longer missions, therefore, associated system costs are increased. Clearly a need exists for solutions to the aforementioned problems.

BRIEF DESCRIPTION OF THE DRAWINGS

Advantages of the present invention will be readily apparent from the following detailed description of preferred embodiments thereof when taken together with the accompanying drawings in which.

DETAILED DESCRIPTION OF THE PREFERRED EMBODIMENTS

Figure 1:
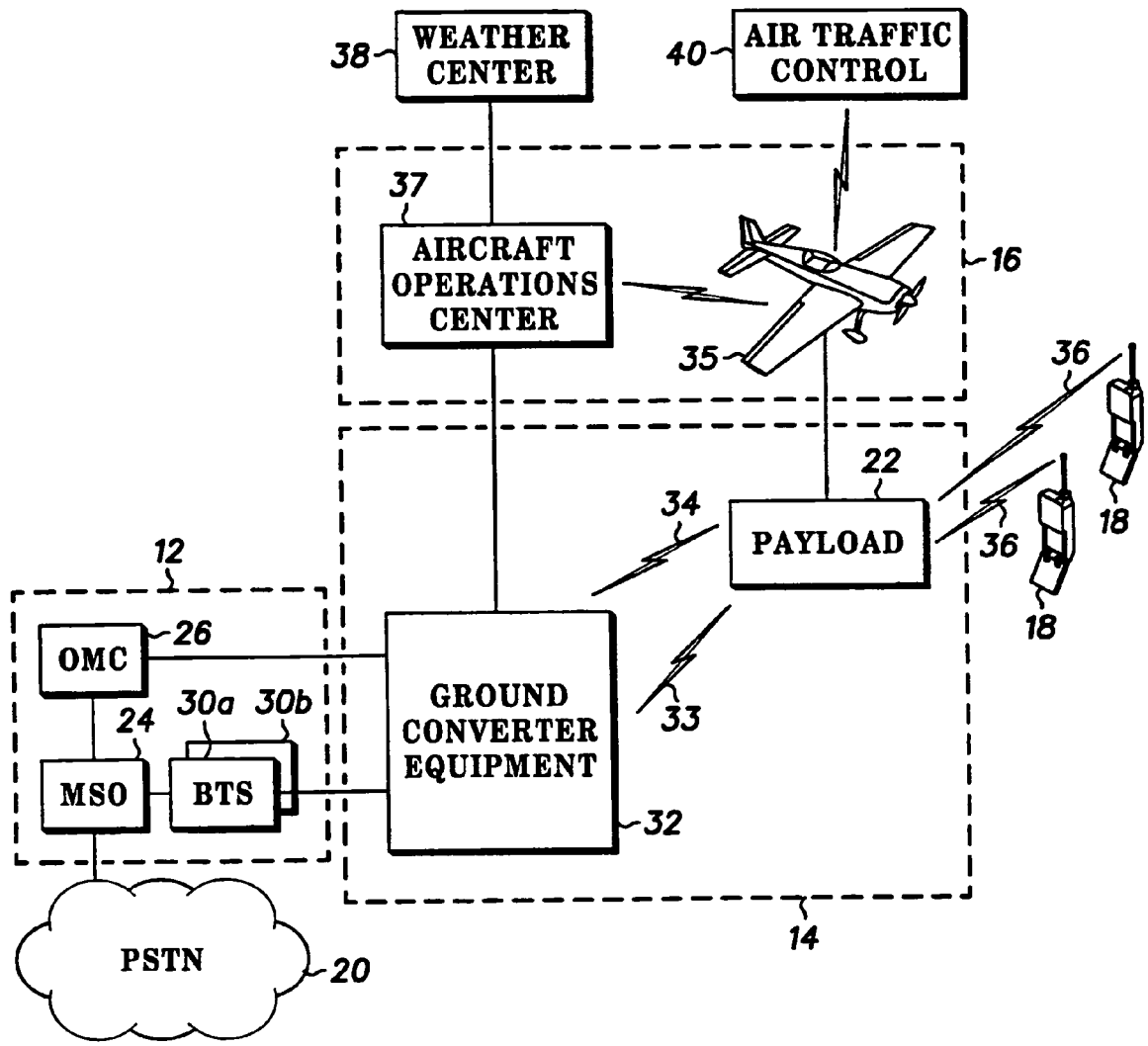
FIG. 1 is a system diagram of an airborne cellular communications system in accordance with the present invention.

Referring now to the drawings in which like numerals reference like parts, FIG. 1 shows an airborne cellular communications system 10. The system 10 generally includes three primary segments: a cellular infrastructure segment 12, a radio infrastructure segment 14, and an airplane segment 16. These three segments in combination are capable of providing cellular communications coverage to a large geographical area by enabling system users, represented generally by handsets 18, to link to a public switched telephone network (PSTN) 20 via an airplane payload 22 including a repeater. The structure and function of each of these three system segments will be discussed in detail.

The cellular infrastructure segment 12 includes a mobile switching office (MSO) 24 that includes equipment, such as a telephony switch, voicemail and message service centers, and other conventional components necessary for cellular service. The MSO 24 connects to the PSTN 20 to send and receive telephone calls in a manner well known in the art In addition, the MSO 24 is connected to an operations and maintenance center (OMC) 26 from which a cellular system operator manages the cellular infrastructure segment 12. The MSO 24 is also connected to one or more base transceiver stations (BTSs) such as the BTSs shown at 30a, 30b. The BTSs 30a, 30b transmit and receive RF signals from the system users 18 through the radio infrastructure segment 14.

More specifically, the BTS 30a, 30b transmits and receives RF signals through ground converter equipment 32. The ground converter equipment 32 converts terrestrial cellular format signals to C-band format signals and communicates with the airborne payload 22 through a feeder link 33 and a telemetry link 34, each of which will be discussed later in detail. The payload 22 establishes a radio link 36 for connecting calls over a wide geographic area of coverage, or footprint, that is capable of exceeding a diameter of 350 km when the airplane maintains a flight pattern at or around 30,000 feet above the ground.

In addition to the airplane 35, the airplane segment 16 also includes an airplane operations center 37 that controls mission logistics based at least in part on information from sources such as a weather center 38, and manages all system airplanes, as the system preferably includes three airplanes to ensure continuous coverage. The airplane also receives additional routine instructions from sources such as an air traffic control center 40.

Figure 2:
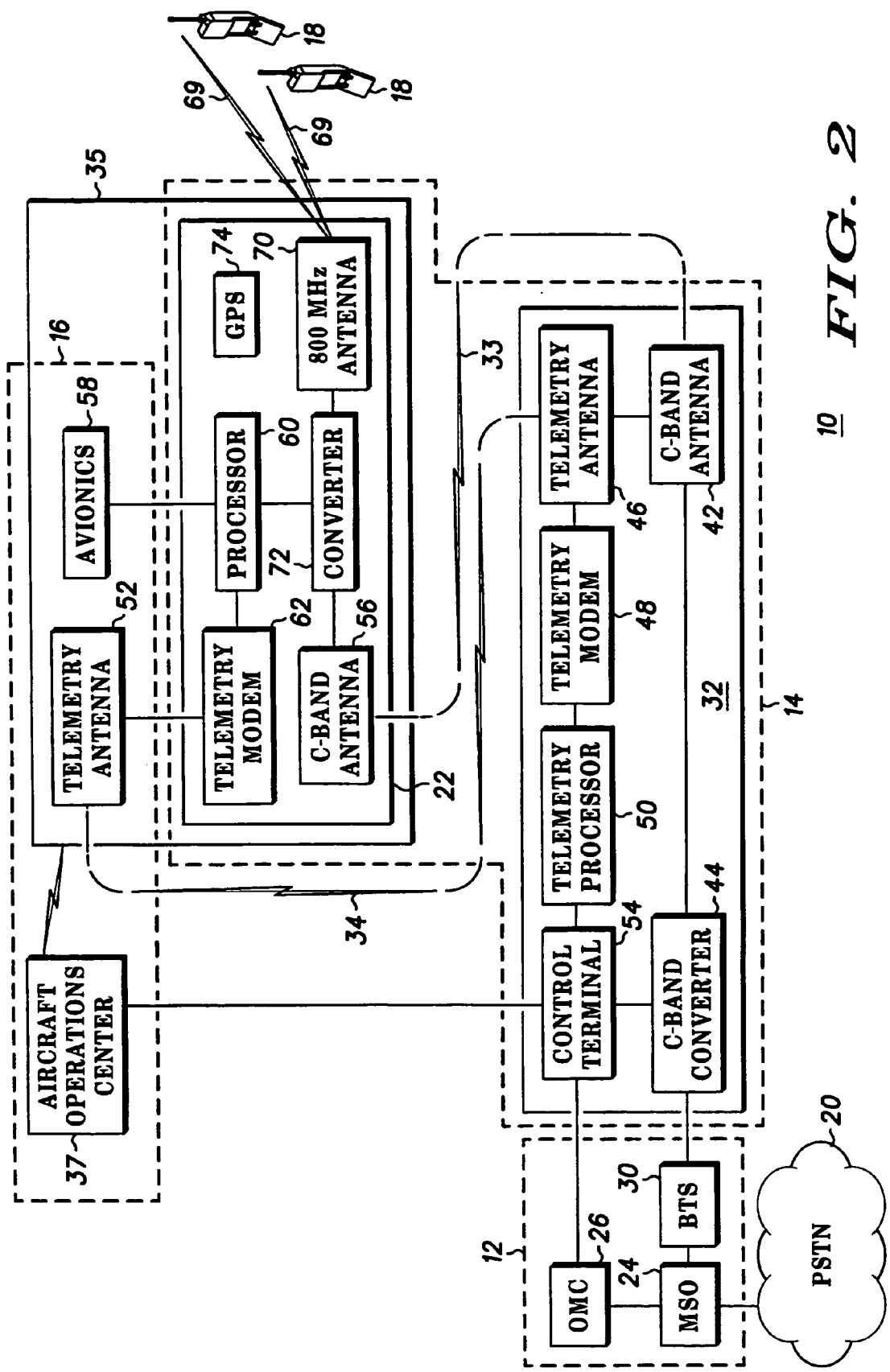
FIG. 2 is a physical block diagram illustrating the components of the airborne cellular communications system shown in FIG. 1 in more detail.

FIG. 2 shows certain components of the system 10 in more detail. Specifically, the ground converter equipment 32 includes a C-band antenna 42 for receiving/transmitting signals from/to the payload 22 (a second antenna is also provided for redundancy purposes), and a C-band converter 44 for appropriately converting the signals received from or to be transmitted to the payload 22. According to a preferred embodiment, the C-band antenna 42 and the converter 44 enable 800 MHz airborne cellular antennas 70 to communicate with the BTSs 30a, 30b via an established downlink, or feeder link, 33, and the converter 44 upconverts nominal signals from the BTSs 30a, 30b to C-band signals before the signals are transmitted to the airplane 35. Also, each BTS 30a, 30b is assigned a different band in the C-band spectrum so that signals from the different BTSs 30a, 30b can be separated and routed to the correct antenna, such as the antenna 56, at the payload 22. In addition, the ground control equipment 32 includes telemetry components such as a telemetry antenna 46, a telemetry modem 48 and a telemetry processor 50 to receive and process airplane data transmitted from an airplane telemetry antenna 52, while a control terminal 54 controls transmission of the processed telemetry data to the OMC 26 and the airplane operations center 37.

In the airplane segment 16, the airplane telemetry antenna 52 mentioned above transmits airplane avionics data generated by airplane avionics equipment, represented generally at 58, including airplane location, direction and flight pattern data as well as other data such as airplane pitch, roll and yaw data. The data from the airplane avionics equipment 58 is input into and processed by a payload processor 60 before being output to the telemetry antenna 52 through a telemetry modem 62. The payload processor 60 is also responsible for processing signals transmitted to and received from the ground converter equipment 32 through the feeder link 33 established between the C-band antennas 42, 56 and for processing signals transmitted to and received from the system users 18 through a downlink, or user link, 69 established between the users 18 and a payload downlink antenna such as an 800 MHz antenna 70, with the signals received by and transmitted from the payload being appropriately upconverted or downconverted by an 800 MHz converter 72. The payload 22, in addition to including the above-mentioned equipment, also includes GPS equipment 74 that can also be input into the processor 60 and transmitted to the ground converter equipment 32 or to the airplane operations center 37 for flight control and/or monitoring purposes. The components shown in the airplane and in the payload together form the airplane repeater that enables cellular coverage to be provided to a large geographic area that may otherwise not support terrestrial cellular coverage due to an insufficient number of cell stations or the like.

As should be appreciated from the system configuration shown in FIGS. 1 and 2, both the airborne cellular system 10 and conventional terrestrial cellular systems appear identical to the PSTN 20 and the system users 18. In other words, there are no discernable service-related differences between calls linked to the PSTN 20 through the cellular infrastructure, radio infrastructure and airplane segments 12–16 and calls handled through a conventional terrestrial system infrastructure, in part due to the fact that the cellular infrastructure segment 12 includes a standard telephony switch in the MSO 24 and BTSs 30a, 30b that are identical or nearly identical to those included in a conventional terrestrial system infrastructure. Still referring to FIGS. 1 and 2, operation of the components of the airborne cellular system 10 during completion of a call made by one of the system users 18 will now be described. The airplane 35, when on-station preferably flies in a circular or near circular flight pattern (although the flight pattern may vary according to specific weather and coverage conditions) to provide coverage to a predetermined geographic area during a mission. While it is on-station, the airplane maintains contact with the ground converter equipment 32 to provide both the feeder link 33 and the user link 36 for the cellular infrastructure segment 12 through the radio infrastructure equipment segment 14. The airplane 35 also transmits a predetermined number of communications beams, such as, for example, 13 beams, over the coverage area, with each beam being assigned to a sector of one of the BTSs 30a, 30b and having its own set of control and traffic channels to carry signaling and voice data between the system users 18 and the cellular infrastructure segment 12. As the airplane 35 moves in its flight pattern, the beams radiated from the airplane rotate. Therefore, the system users 18 will "see" a different beam every 45 seconds or so, the cellular infrastructure segment 12 performs a sector to sector handoff of the call to keep the call from being dropped.

When initiating a call, a system user, such as one of the users 18, utilizes the control channels in the beam to signal the MSO 24 to request a call setup. The request is sent from a handset of the user 18 to the airplane payload 22, and then is relayed to the ground converter equipment 32. The ground converter equipment 32 relays the request to the corresponding BTS, such as the BTS 30a. The BTS 30a then transmits the request to the MSO 24, which sets up the call with the PSTN 20. The payload 22 therefore simply extends the physical layer of the BTS 30 to the users 18 to allow a much wider area of coverage than would typically be provided by a conventional terrestrial system, and with less associated infrastructure buildout cost. The airborne system 10 is also preferable for providing temporary cellular coverage for special events areas, where coverage is only needed for several days, thereby eliminating the need and cost associated with erecting cell stations and then tearing the cell stations down after the special events end.

Once the call setup is completed, voice communication with the PSTN 20 through the traffic channels in the beam is initiated, and voice information is then relayed in the same manner as the signaling information. When the call ends, a signal is sent to the MSO 24 to tear down the call, the handset of the user 18 releases the traffic channel used for voice communications, and the channel is returned to an idle state.

Figure 3:
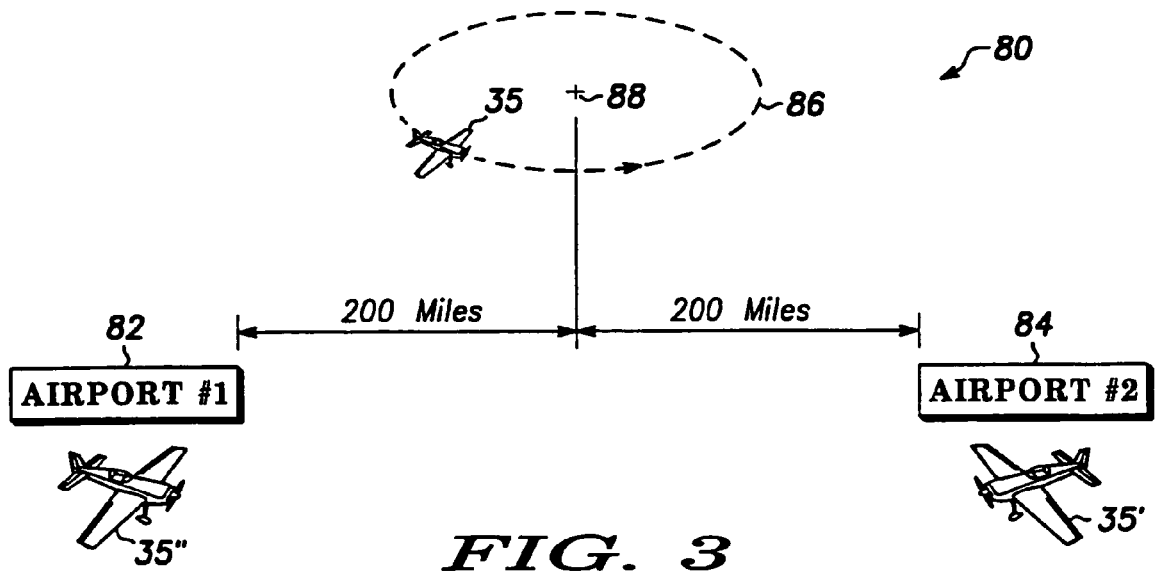
FIG. 3 is a block diagram of an airport configuration of a first embodiment in accordance with the present invention showing airport locations relative to a flight pattern of the airplane shown in FIG. 1.

FIG. 3 shows a two-airport support configuration 80 of a first preferred embodiment in accordance with the present invention that is used to support the airplane 35 and to ensure availability of the airborne cellular communications system shown in FIGS. 1 and 2. Specifically, the two-airport support configuration includes first and second airports 82, 84 spaced a predetermined distance apart from each other, with 400 miles being the exemplary distance in the embodiment shown in FIG. 3.

The first airport 82 serves as the support and maintenance base for the airplane 35" shown providing coverage to a predetermined geographic area by executing a flight pattern 86 having a pattern center 88 that is generally equidistant from both of the airports 82, 84. The first airport 82 includes staffed mechanics for servicing the airplane 35" between missions, as well as air traffic control facilities such as the airplane operations center 37 and the weather center 38 shown in FIG. 1. The second airport 84 serves as the support and maintenance base for a second system airplane, such as an airplane 35', that alternates with the airplane 35" in executing the flight pattern 86 to provide the predetermined geographic area with uninterrupted cellular coverage. In addition, the second airport 84 may also serve as the support and maintenance database for an additional airplane, such as an airplane 35", that may be included in the system 10 as a backup airplane to execute the flight pattern 86 if one or more of the airplanes 35', 35" both become unavailable due to adverse weather conditions or maintenance problems, as further discussed below.

Although, the airport 82 is described as serving as the support and maintenance database for the airplane 35", and the airport 84 is described as serving as the support and maintenance database for the airplane 35", in actuality any of the airplanes 35", 35', 35 can utilize either of the airports 82, 84 for maintenance and support needs. Further, one of the arts 82, 84 may serve as a primary maintenance and support base while the other of the two airports serve as an auxiliary base and may provide more limited services, such as hangar and fueling services and/or redundant airplane operations center support. In such a configuration, the airport serving as the auxiliary base may only be used during certain times, such as during adverse weather conditions, when the planes cannot land at the airport serving as the primary maintenance and support base, or when the airport serving as the primary maintenance and support base experiences technical difficulties such as a power outage. The specific services provided by each of the airports 82, 84 will be determined based on specific system needs and operating conditions.

In accordance with the first embodiment, each of the airplanes 35', 35" is an airplane designed to fly at low altitudes, such as a Pilatus Model PC12 airplane, which is capable of flying daily missions of up to 8 hours in duration each The airplane 35' takes over execution of the flight path 86 for the airplane 35" at the end of the mission of the airplane 35" in a manner discussed below. Likewise, the airplane 35" takes over execution of the flight path 86 for the airplane 35' at the end of the mission of the airplane 35'. If one of the airplanes, such as the airplane 35' as shown in FIG. 1, cannot take off from an airport, such as the airport 84, at which it is located due to inclement weather in the vicinity of the airport 84 or due to maintenance-related problems, the airplane 35" may instead be used to take over flight pattern execution from the airplane 35'.

Still referring to FIG. 3, the airports 82, 84 are staged a predetermined distance apart from each other, with the predetermined distance preferably corresponding to a glidedown distance of a low altitude small engine plane. The above-discussed 400 mile separation between the airports 82, 84 corresponds to the 200 mile glide down distance of the commercially produced Pilatus PC12, which is designed to operate at between 30,000 and 45,000 feet. However, the actual distance will vary depending on the type and model of planes used to execute the flight pattern, as well as local weather patterns, terrain, and customer coverage variations, and may range from, for example, 15,000–60,000 feet. Therefore, if a plane executing the fight pattern 86 develops engine problems, it can safely glide down to either of the airports for service. The separation distance also minimizes the probability that a single storm, which rarely covers an entire 400-mile radius geographic area, will prevent take-offs and landings at both 82, 84. Further, if a storm moved into the area of the airport 84 and a backup airplane such as the airplane 35" was not available at the airport 82, the airplane 35 could alternatively be ferried to the airport 82 to support a subsequent mission.

Therefore, the configuration 80 of the first preferred embodiment facilitates dynamic mission planning for airplanes that provide repeater coverage to a geographic area for the cellular communications system 10 in a manner that minimizes system down time due to adverse weather conditions such as thunderstorms and due to airplane mechanical failure. Fly-up and fly-down time for each of the planes 35, 35', 35" is more flexible, as one or more planes is always ready to take over execution of the flight pattern 86. Further flexibility may be provided to the system 10 in accordance with the above preferred embodiment by making airplanes in addition to the airplanes 35, 35', 35" available in the configuration 80, or by making airports available in addition to the airports 82, 84 to help further avoid system downtime due to weather problems and to provide further system redundancy.

Figure 4:
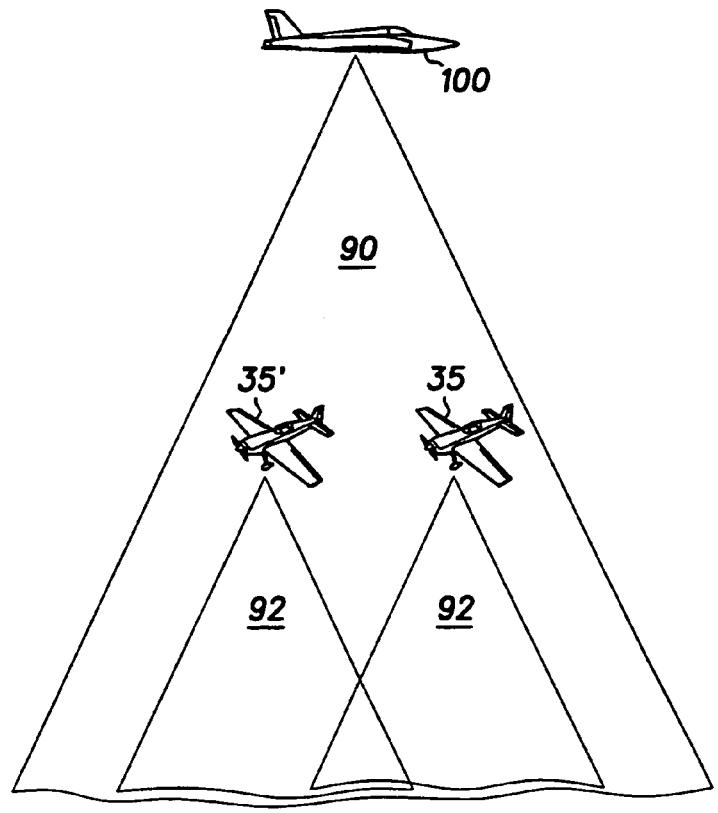
FIG. 4 is a schematic diagram showing beam pattern coverage areas for a multi-airplane airborne cellular system of a second embodiment in accordance with the present invention as well as a single airplane implemented high-altitude airborne cellular system.
Figure 5:
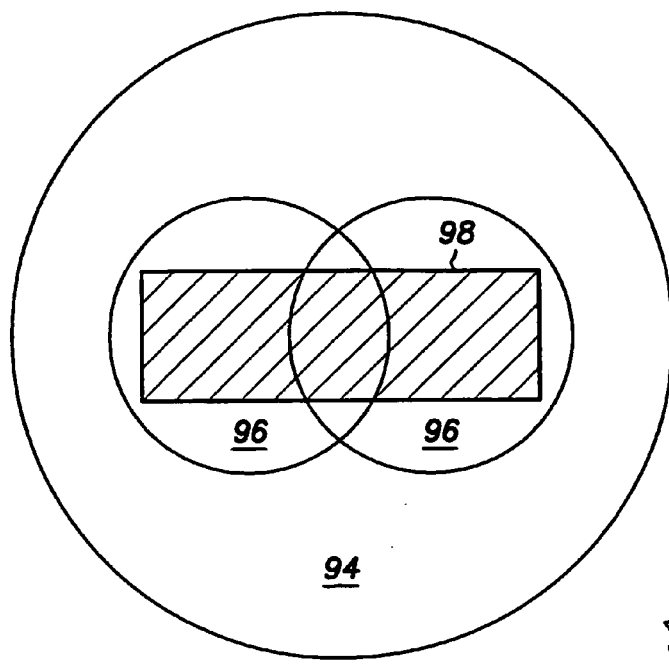
FIG. 5 is a plan view showing a beam pattern footprint for the multi-airplane airborne cellular system of the second embodiment as well as a single airplane implemented high-altitude airborne cellular system.

FIGS. 4 and 5 show beam patterns and corresponding beam footprints of both a high altitude airborne cellular communications system 90 and a low altitude airborne cellular communications system 92, while FIG. 5 shows beam footprints 94, 96 corresponding to the respective beam footprints 90, 92, as well as a geographic area 98 requiring cellular coverage. In a second preferred embodiment in accordance with the present invention, the beam pattern 92 and resulting beam footprint 96 are realized trough simultaneous use of two commercially produced airplanes, such as the airplanes 35', 35" shown in FIG. 3 and represented generally as shown in FIG. 4, while the high-altitude airborne cellular communications system beam pattern 90 and resulting footprint 94 are realized through use of a single high-altitude plane capable of executing a flight pattern at an altitude of more than 50,000 feet and represented generally in FIG. 4 at 100.

The lower altitude airplanes 35', 35" are less expensive than a high-altitude airplane would be if such a plane were available. Currently, although such a high altitude airplane has been proposed, no such high-altitude planes are in production. However, estimated start-up costs for such a plane would be between $30 million and $60 million. In addition, more stringent FAA requirements, including redundant oxygen systems, higher cabin burst pressures, and high altitude pilot training requirements, would have to be met. The airplanes 35', 35" have more desirable performance parameter, such as ascent and descent time (approximately 30 minutes) and flight mission duration (4–6 hours), than would a high altitude airplane (estimated ascent/descent time of 1–2 hours; estimated flight mission duration of 20–40 hours). In addition, low altitude airplane missions are more flexible in that multiple contingency options, such as weather issues, airplane mechanical failure, and airport maintenance options, may be built into mission planning by the airplane operations center 37 to guard against system downtime due to airplane maintenance problems.

Figure 6:
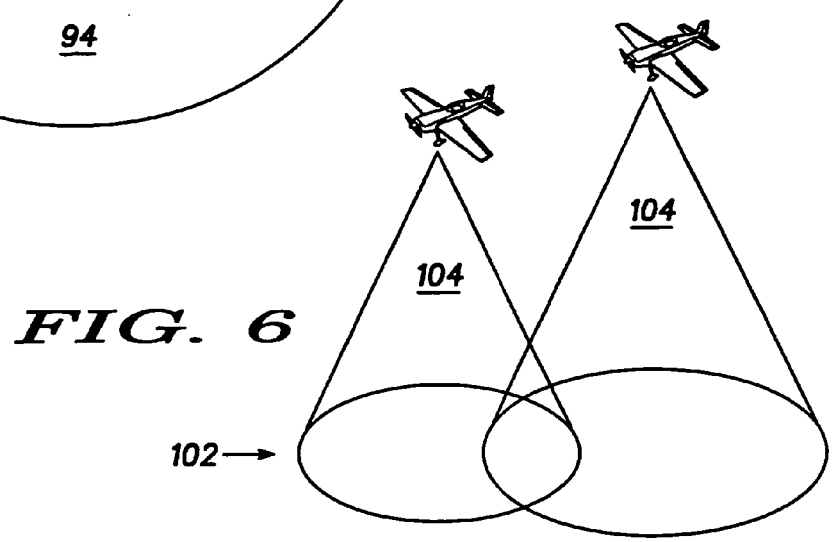
FIGS. 6–8 are schematic diagrams showing footprints that can be formed by a multi-airplane airborne cellular system according to the second embodiment.
Figure 7:
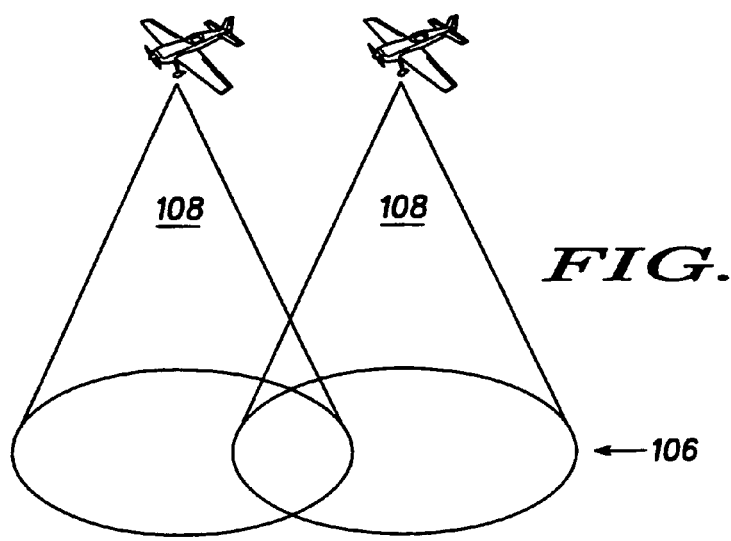
Figure 8:
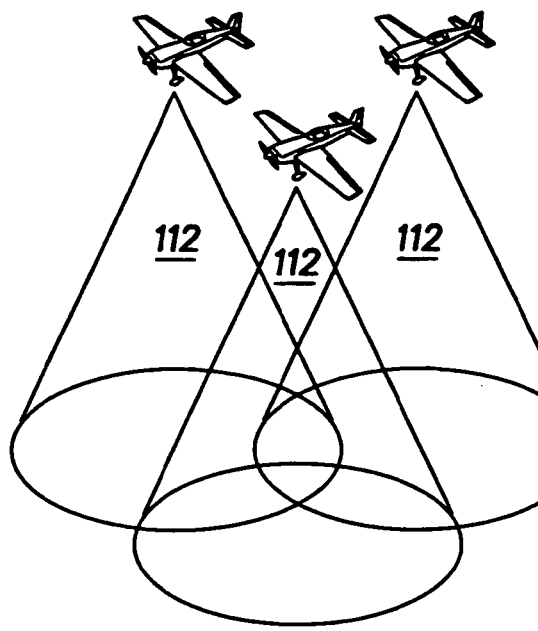

As shown in FIG. 5, the two airplanes 35', 35" are capable of providing a more accurate mission-specific footprint 96 that is more focused on the geographic area 98 than the high altitude airplane 100. The size and shape of such a footprint can be varied by varying the altitude of one or both of the airplanes 35', 35" to vary the beam pattern(s). Consequently, beam footprints may be shaped in, for example, a FIG. 8 type form as shown at 102 in FIG. 6 from beam patterns 104, or a box-type form as shown at 108 in FIG. 7 from beam patterns 106. Alternatively, as shown in FIG. 8, multiple planes may be used to form combination beam patterns tailored to a specific customer base. For example, if three planes such as the planes 35, 35', 35" were utilized, a triangular-type footprint such as the footprint 108 shown in FIG. 8 could be formed from beam patterns 110.

It should also be appreciated that the multiple-airplane implemented coverage could be extended to the two-airport support configuration of the first embodiment so that airborne coverage groups each including two or more airplanes could be implemented to execute predetermined flight patterns in a cyclical fashion much in the same way that the single airplane flight patterns discussed above in connection with FIG. 3 were implemented.

Therefore, the second preferred embodiment provides for a multi-airplane implemented airborne cellular communications system in which two or more repeater-carrying airplanes are capable of providing the same, albeit more focused, cellular coverage than a single high-altitude repeater-carrying airplane. Multiple airplanes are capable of providing better earth footprint coverage due to the flexibility in possible antenna patterns due to varying the flight patterns and/or altitudes of one or more of the airplanes used to form the earth footprint.

Figure 9:
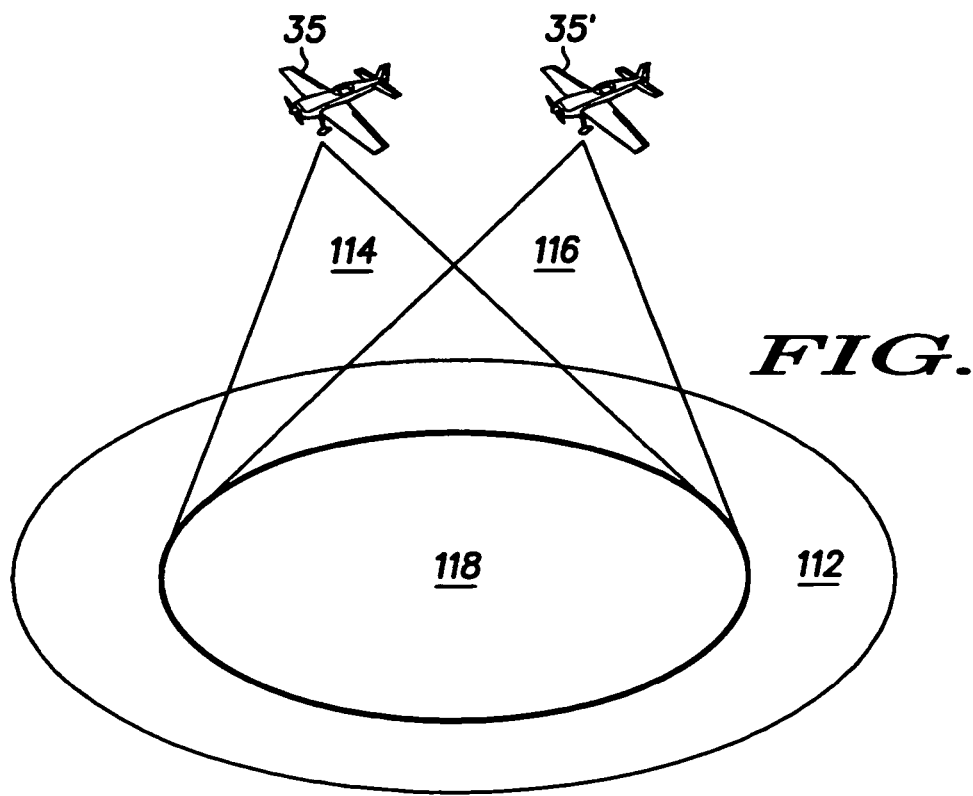
FIGS. 9–10 are schematic diagrams showing two airplanes in the mufti-airplane airborne cellular system of a third embodiment in accordance with the present invention performing signal hand-off and weather pattern mitigation techniques, respectively.
Figure 10:
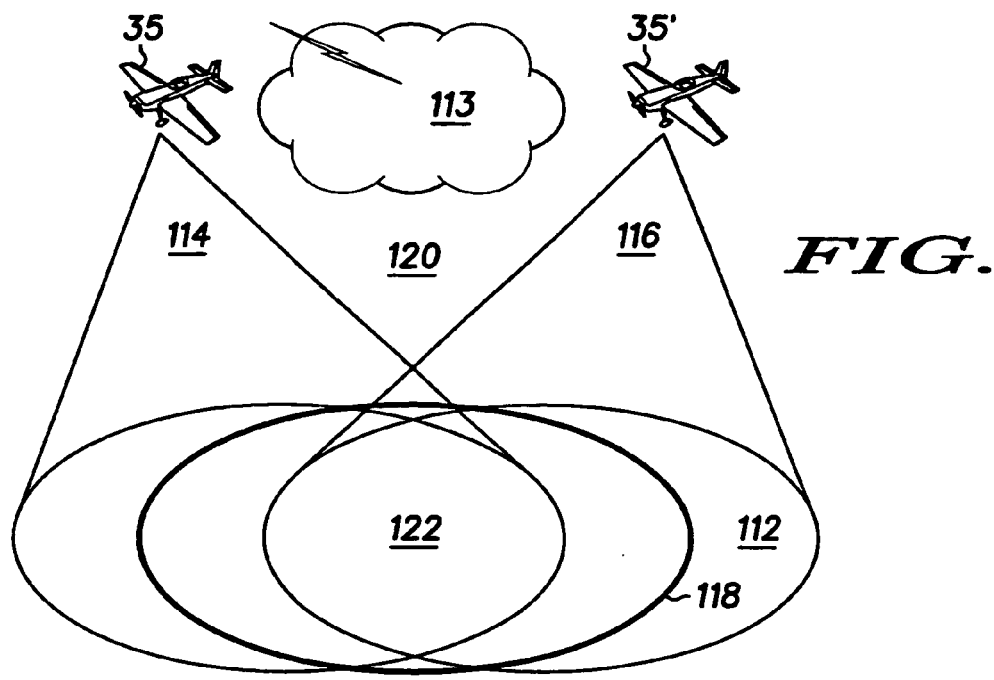

Referring to FIGS. 9 and 10, a third preferred embodiment in accordance with the present invention will now be discussed. Specifically, FIG. 9 shows two airplanes in an airborne cellular communications system, such as the planes 35, 35', performing a communications coverage handoff to ensure communications coverage within a geographic area such as the area 112. If, for example, the airplane 35 is executing its flight pattern and the weather center 38 determines that adverse weather, such as a thunderstorm 113 in FIG. 10, is moving into the area, the airplane 35' can take off from an airport, such as the airport 84 in FIG. 3, and ascend to a predetermined altitude. At this predetermined altitude, the airplanes 35, 35' project nearly-identical beam patterns 114, 116 onto the geographic area 112 to form a combination footprint 118. Therefore, both airplanes 35, 35' are providing communications links to system users on the ground.

As shown in FIG. 10, the two airplanes 35, 35' separate to allow the storm 113 to pass between the airplanes. Preferably, a gap 120 formed between the two airplanes 35, 35' is normal to the direction of the storm 113. Antenna angles for each of the airplanes 35, 35' are increased, but beam pattern signals due to beam pattern duplication are amplified at far-reaching beam locations at 122, thereby ensuring continued communications coverage in areas affected by the storm 113. This is because beam pattern signals need to penetrate less of the storm, as the signals radiate from the side of the storm rather than through it. In addition, the side lobe power of airplane antennas such as the antenna 70 in FIG. 2 can be increased to assure adequate link margins in such a situation.

When the storm 113 dissipates, the airplanes can return to flight pattern positions as shown in FIG. 9 so that nearly identical beam patterns are again formed. If the first airplane 35 is near completion of its mission, the second airplane 35' can then assume responsibility for the entire communications link, thereby enabling the airplane 35 to fly down to one of the airports 82, 84 for re-fueling, maintenance, crew change and the like.

Therefore, the third preferred embodiment enables multiple antenna beams pointed from two airplanes to enhance communications hand-offs from one airplane to another to ensure continuous cellular coverage for system users, even during inclement weather, as the beams may be pointed around the storm rather than through it.

Figure 11:
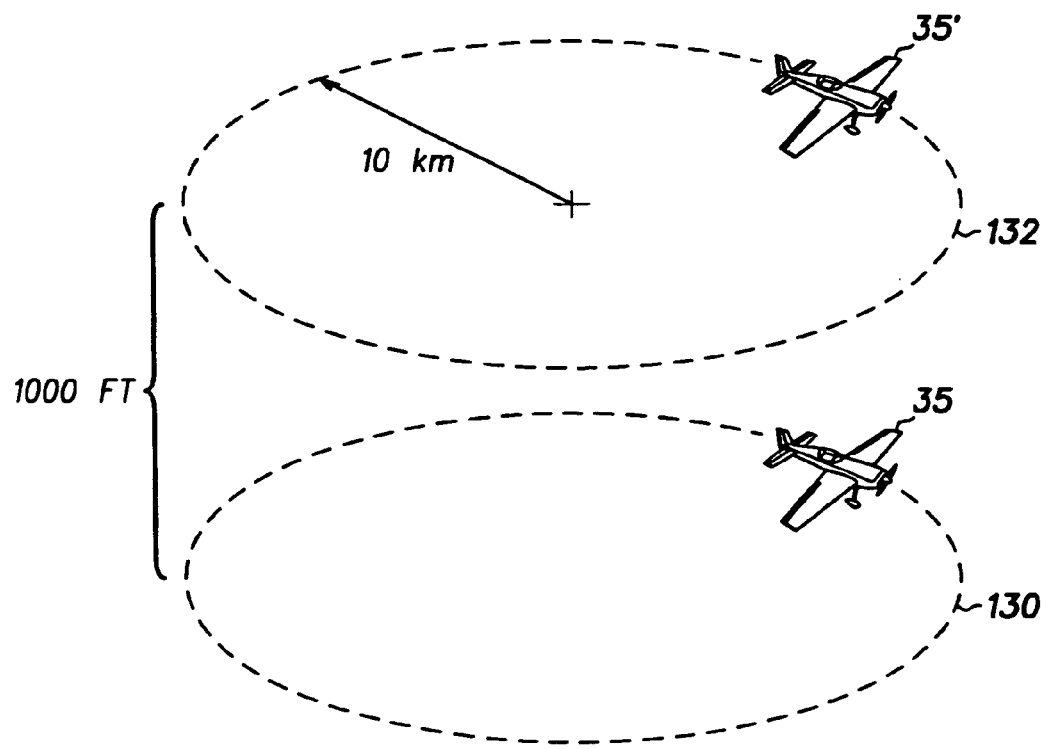
FIG. 11 is a flight pattern diagram showing two airplanes in a mufti-airplane airborne cellular system of a fourth embodiment in accordance with the present invention performing a communication switching technique.

Referring now to FIG. 11, additional communications switching between the two airplanes 35, 35' according to a fourth preferred embodiment in accordance with the present invention will now be discussed. Specifically, the primary communications link provided by the airborne repeater must be switched from an existing plane executing a communications flight pattern to a subsequent plane taking the place of the current plane. This switchover must occur, however, in a seamless manner so as not to affect the underlying service. To effect such a transfer, for example, the airplane 35' takes off from one of the airports 82, 84 shown in FIG. 3 and ascends up to an altitude that is different than that of the airplane 35, while the airplane 35 continues to execute a clockwise communications coverage flight pattern 130. For example, as shown in FIG. 11, the altitude of the airplane 35' may be 1,000 feet higher than that of the airplane 35. At this predetermined altitude, the airplane 35' begins to execute its own clockwise flight pattern 132 that is similar in radius to, but slightly out of phase with, the fight pattern 130. Once the airplane 35' begins executing the flight pattern 132, either a ground control-directed communications switchover or a power control-directed switchover is initiated, each of which will now be described in more detail and each of which has no impact on system users.

Figure 12:
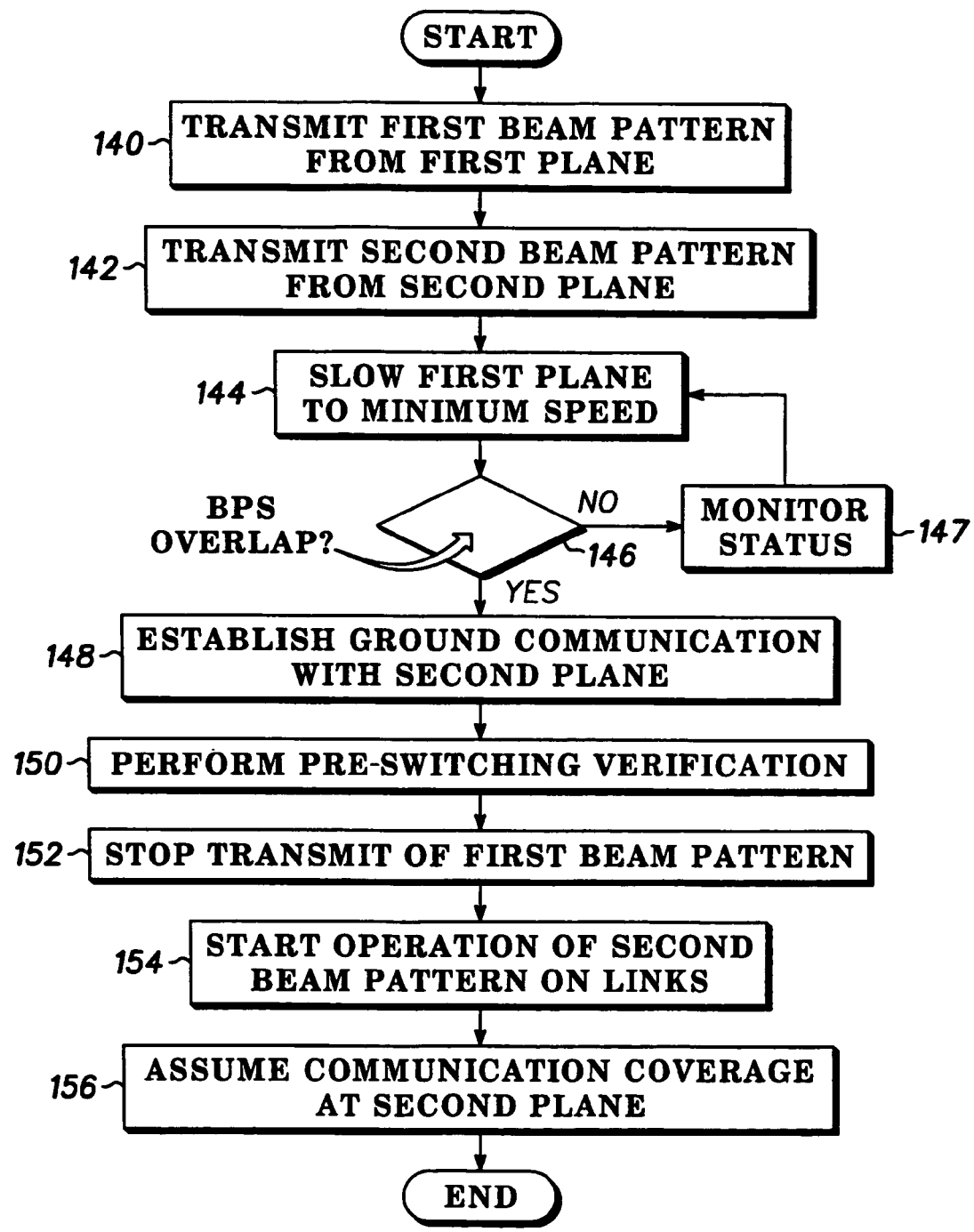
FIGS. 12–13 are flow diagrams of two alternate methodologies of the fourth embodiment for switching from one flight pattern on the coverage circle shown in FIG. 11 to another flight pattern.

Referring to the flow diagram in FIG. 12, ground control directed switchover of call traffic from one airplane to another will now be described. Specifically, at 140, a first plane, such as the plane 35, transmits a first communications beam pattern while executing a normal flight pattern 130 at a predetermined mission altitude, which is typically in a standard altitude range of, for example, 28,000–31,000 feet, and at a minimum loiter speed to maximize mission time. At 142, a second airplane such as the airplane 35' flies up to a predetermined altitude and transmits a second communications beam pattern while executing a rendezvous flight pattern such as the flight pattern 132. At 144, after the second airplane initiates the rendezvous flight pattern, and attempts to approximately match the speed of the first airplane with a flight pattern phase offset of 180 degrees, it is determined at 146 whether the airplanes are aligned within respective flight patterns, and therefore the corresponding beam patterns from the airplanes are overlapping, based on telemetry data from both of the airplanes. Alternatively, the technique may be designed to provide for call traffic switchover when: (a) the first and second airplanes are in parallel flight patterns at identical altitudes and separated by an FAA-approved offset distance; (b) the first and second planes are executing respectively an identical flight pattern but are 180 degrees out of phase; or (c) the first and second airplanes are executing separate flight patterns at different altitudes and in opposite directions.

If the beam patterns are not overlapping, the status of the beam patterns is monitored at 147 until it is determined that the airplanes are aligned and corresponding beam patterns are overlapping. At 148 the ground-based portion of the system 10, including the cellular and radio infrastructure segments 12, 14, then establishes communication with the second airplane and determines a time for executing communications switchover. At 150, pre-switchover verification may be performed by, for example, the second airplane receiving communications signals from the radio infrastructure segment 14 and system users. At 152, the ground-based portion of the system 10 directs the first airplane to cease transmitting its communications signal beam pattern, and quasi-simultaneously at 154 directs the repeater of the second airplane to begin operation on the feeder, telemetry and user links 33, 34, 36 on which the repeater of the first airplane is ceasing operation. Consequently, at 154, switchover of calls from all system users within a geographic area covered by the beam patterns of the first and second airplanes are switched over from the beam pattern of the first airplane to the beam pattern of the second airplane. This switchover occurs preferably within one communications signal time frame, which is defined as a 2–10 millisecond processing time period. At 156, the second airplane takes over communication coverage from the first airplane by slowing down to a predetermined loiter speed and moving into the flight pattern 130 after the first airplane leaves the first flight pattern 130.

Figure 13:
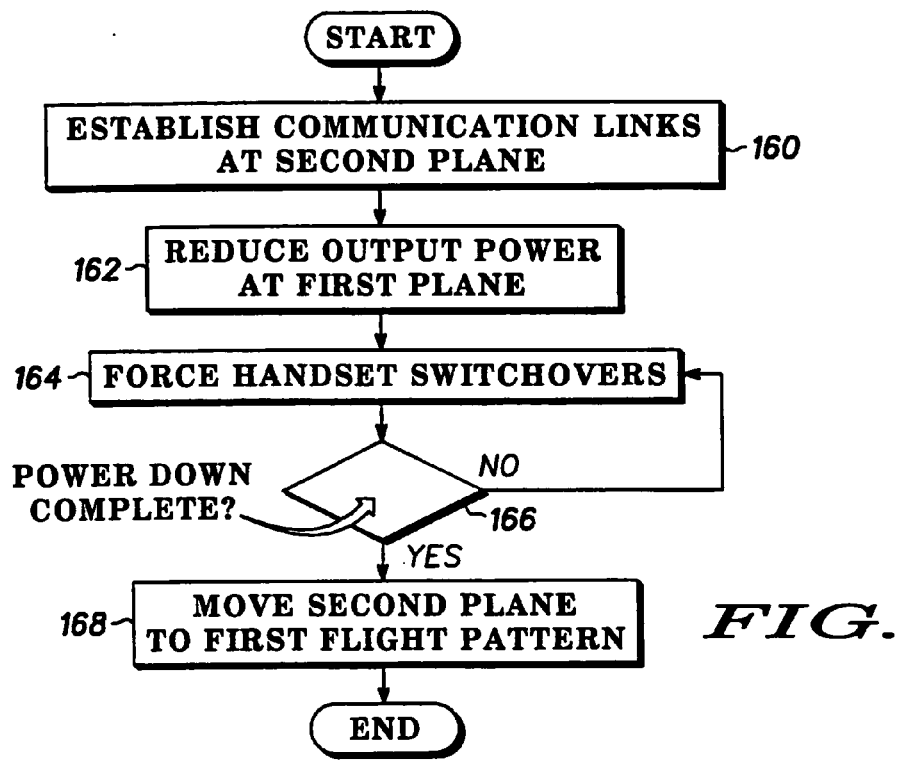

Referring to the flow diagram in FIG. 13, a power control gradual switchover technique for call traffic from one airplane to another will now be described. Steps 140–146 are identical to those described above in connection with the ground control directed switchover technique. At 160, once the second airplane establishes its rendezvous flight pattern, it establishes feeder, telemetry and user links through communications beam patterns identical to those established by the first airplane. Once the beam patterns are established, at 162 the repeater located in the first airplane begins to reduce its output power. At 164, the reduction in power consequently forces terminals/handsets of the system users 18 to switch from a user link beam transmitted from the first airplane to one transmitted from the second airplane in a self-determining manner. The reduction in power can be scheduled to occur over a predetermined time period, such as a time period of several minutes, to allow time for calls to be handed off from the repeater in the first airplane to the repeater in the second airplane at 164.

At 166, it is determined whether the repeater in the first airplane has been completely powered down. If the repeater has not been completely powered down, power reduction at 162 and call switchovers at 164 are continued until the repeater has been completely powered down. Once the repeater has been completely powered down, the repeater in the second airplane assumes the entire call load. Once the first airplane leaves the first flight pattern 130, at 168 the second airplane flies up to execute the first flight pattern 130, or may assume an alternative flight pattern as determined by system parameters.

In both of the above-described switchover techniques, switchover of call traffic from one airplane to another is managed by both the airplanes 35, 35 and the cellular infrastructure segment 12 in a manner similar to that used to manage call hand-offs in a terrestrial cellular communications system. Software specifically may be designed to enable the airborne system 10 to utilize these same basic hand-off/switchover techniques. Preferably, the switchover techniques are executed during low call traffic times, thereby further ensuring that the system is robust and that the number of call drops is minimized.

As a modification to the above-described power control gradual switchover technique, spectral resources may alternatively be split by the base transceiving stations 30a, 30b between the first and second airplanes to facilitate call switch-over from the first airplane to the second airplane, with the percentage of spectral resources assigned to the second airplane being gradually increased until all of the spectral resources, and therefore all call traffic, is allocated to the second airplane.

In view of the foregoing, it should be appreciated that the fourth embodiment ensures that an airborne cellular communications system is robust and scalable in response to customer needs, and that communications service remains uninterrupted, even during communications coverage switchover between system airborne repeaters. In addition, the above-discussed switchover techniques enable an airborne cellular communications system to adopt existing terrestrial system hand-off hardware and software. The switchover techniques can be adapted to the underlying terrestrial system protocol, regardless of whether that protocol is, for example, CDMA, TDMA, GSM or broadband to airborne system protocol. In addition, peak call traffic loads can be addressed by utilizing the coverage of both the above-discussed first and second airplanes to increase call handling capacity, with one of the airplanes being removable from the coverage area through execution of one of the above-discussed switchover techniques when the call traffic load decreases again to a level that is capable of being handled by a single airplane.

Figure 14:
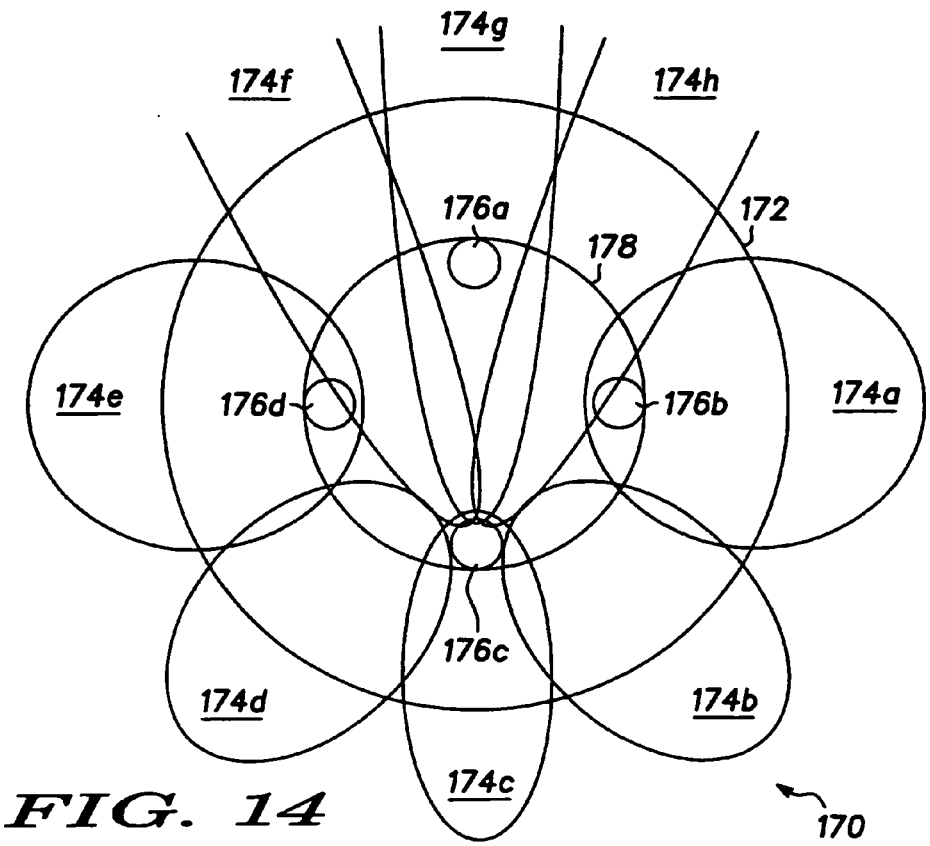
FIG. 14 is a plan view of a beam pattern of a multi-airplane airborne cellular system of a fifth embodiment in accordance with the present invention in which multiple potential flight patterns exist on a larger coverage circle.

FIG. 14 shows a flight pattern 170 of an airplane, such as the airplane 35 shown in FIGS. 1 and 2, of a fifth preferred embodiment in accordance with the present invention. The flight pattern includes a general coverage circle 172 within which the airplane provides communications coverage by transmitting communications beams to form beam footprints 174a–174h on a predetermined corresponding geographic area. Small radius flight patterns such as the circular flight patterns 176a–176d are each tangentially positioned within a larger radius flight pattern circumscribing circle 178.

When an airplane such as the airplane 35 in the airborne cellular communications system 10 executes one of the flight patterns 176a–176d, it is capable of providing desired communications coverage within the general coverage circle 172. However, as may often happen, weather patterns may force the airplane to vary from its predetermined flight pattern by shifting a center point of the flight pattern, thereby diminishing the communications system coverage and availability.

However, the present embodiment enables the airplane to recapture some of the system coverage and availability that is lost during, for example, a thunderstorm in the vicinity of an airplane flight pattern. Specifically, in response to adverse weather conditions, the airplane breaks away from its selected circular flight pattern, such as, for example, the circular flight pattern 176a, and moves around the flight pattern circumscribing circle 178 to a different flight pattern, such as the circular flight pattern 176b, that is also tangential to the flight pattern circumscribing circle 178. Ground-based controls such as the payload processor 60 subsequently control the direction of beams transmitted from the antenna 70 shown in FIG. 2 and which is either a phased array or a fixed array by turning outer antenna beams on and off and shaping the beams to maintain an adequate link margin with respect to outer fringes of the desired geographic area of coverage. Consequently, the beam pattern does not rotate or turn on/off, but rather remains fixed with respect to terrestrial locations covered by the resulting beam pattern footprint. When the airplane reaches the new flight pattern 176b, it executes the flight pattern 176b and resumes rotation of the beam pattern to continue providing cellular communications coverage.

Therefore, the flight pattern configuration and airplane movement technique of the fifth embodiment reduces the total possible geographic area that can be covered by an airplane when compared to a similar centrally-orbiting airplane, the configuration and technique increase overall system availability for the geographic area that is covered by enabling the airplane executing a predetermined flight pattern to maneuver around storms and other adverse weather patterns without dropping coverage.

Figure 15:
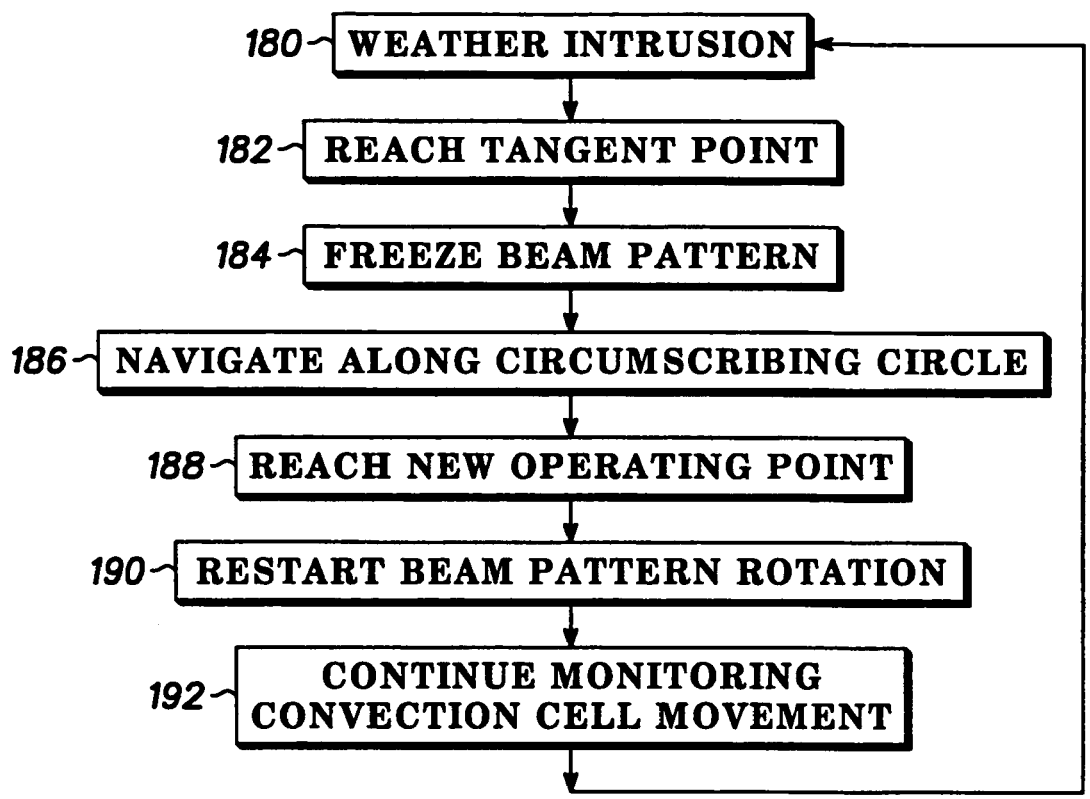
FIG. 15 is a flow diagram of the methodology of the fifth embodiment that effects switching from one of flight patterns shown in FIG. 14 to a subsequent flight pattern without losing coverage in the underlying geographic coverage area.

FIG. 15 is a flow diagram that summarizes the methodology used to determine whether an airplane executing one of the flight patterns 176a–176d should be moved along the flight pattern circumscribing circle 178. At 180, it is determined that weather that has begun to affect or that will affect communications coverage has intruded into the vicinity of a currently-executed airplane flight pattern. The airplane continues to execute its current flight pattern until, at 182, it reaches a point in the flight pattern that is tangential to the flight pattern circumscribing circle 178. At 184, the OMC 26 transmits commands to the airplane that freeze the beam pattern transmitted from the airplane relative to the ground, and at 186 the airplane begins to navigate along the flight pattern circumscribing circle 178. The airplane continues to navigate along the flight pattern circumscribing circle 178 until at 188 it reaches a new operating point outside of the intruding weather pattern that corresponds to a point of one of the circular flight patterns 176a–176d that is also tangential to the flight pattern circumscribing circle 178. Upon reaching the new operating point, the airplane then restarts normal beam pattern rotation at 190 as it executes its new flight pattern, and at 192 resumes monitoring for convection cell movement until either a new adverse weather pattern intrudes into its flight pattern or until the airplane completes its mission.

Therefore, the flight pattern configuration and airplane movement technique of the fifth embodiment in accordance with the present invention achieves higher operational availability for an airborne cellular communications system than a simple circular flight pattern, as it provides an airplane providing communications coverage to circumvent storms and other adverse weather conditions by moving among small flight patterns tangentially located on a larger flight pattern operating circle. System availability is therefore increased.

While the above description is of the preferred embodiment of the present invention, it should be appreciated that the invention may be modified, altered, or varied without deviating from the scope and fair meaning of the following claims.

What is claimed is:

1. A communications link for the cellular communications system, comprising:
    a first airplane for flying in a first pattern and including a first antenna for transmitting RF beams to form a first footprint on a first target geographic area to provide cellular phone users within the footprint with a first communications link said second footprint at least partially overlapping said first footprint;
    a second airplane for flying in a second pattern and including a second antenna for transmitting RF beams to form a second footprint on a second target geographic area to provide cellular phone users within the second footprint with a second communications link;
    said first and second airplane configured to fly in the first and second patterns at an altitude less than approximately fifty thousand (50,000) feet;
    said first and second patterns being varied to enable the first and second airplane to provide continuous uninterrupted coverage via first and second beam patterns, respectively, to a service area below in a weather pattern-independent and geographic feature-independent manner.

2. The communications link of claim 1, further comprising a first airport located away from a center of a coverage area of the first and second airplane corresponding to a glide-down distance of the first and second airplane.

3. The communications link of claim 2, further comprising a second airport for providing services generally redundant to those at the first airport, the second airport being situated at a location that is accessible to the first and second airplane.

4. The communication link of claim 3, further comprising a third airplane located at one of the first and second airports for providing coverage redundant to that of the first and second airplanes.

5. The communications link of claim 1, wherein the first and second airplanes comprise a first airborne coverage group, and further comprising at least one other airborne coverage group for providing services generally redundant to those of the first airborne coverage group.

6. The communications link of claim 1, wherein the first and second airplanes fly at the same altitude that is less than approximately fifty thousand (50,000) feet.

7. The communications link of claim 1, wherein the first and second airplanes fly at different altitudes that are less than approximately fifty thousand (50,000) feet.

8. The communications link of claim 1, wherein altitudes of the first and second airplanes vary according to link margin requirements.

9. The communications link of claim 1, wherein said first and second airplanes are configured to fly in the first and second patterns at altitudes of approximately thirty thousand (30,000) feet.

10. The communications link of claim 1, wherein at least one of the first and second airplanes is for adjusting the first and second flight patterns, respectively, so that at least one of the first and second beam patterns is capable of circumventing a storm.

11. The communications link of claim 1, wherein the first airplane is for handing off calls to the second airplane when necessary to provide the continuous uninterrupted communications coverage.

12. An airborne link for a cellular communications system, comprising:
    a first airplane configured to fly in a first pattern at a first altitude less than approximately fifty thousand (50,000)

feet and configured to transmit RF beams to provide communications coverage within a first beam footprint covering a specified geographic area; and a second airplane configured to replace the first airplane at an end of a mission of the first airplane by establishing a second flight pattern at a second altitude less than approximately fifty thousand (50,000) feet and a second beam footprint that enables call switchover in a manner that minimizes dropped calls, wherein the first and second flight patterns are substantially parallel flight patterns and substantially 180° out-of-phase flight patterns.

13. The airborne link of claim 12, further comprising a ground control station for directing the call switchover when the second airplane establishes a call switchover rendezvous flight pattern at an altitude less than approximately fifty thousand (50,000) feet.

14. The airborne link of claim 13, wherein the ground control station gradually switches over calls within the first beam footprint to the second beam footprint by gradually reducing output power associated with the first beam footprint to cause user handsets to switch to the second beam footprint.

15. The airborne link of claim 12, wherein the first airplane initiates the call switchover by gradually reducing output power associated with the first beam footprint to cause user handsets to switch to the second beam footprint.

16. A method of switching calls over from an original airplane-based communications link in a cellular communications system to a replacement airplane-based communications link, comprising:

maintaining a first airplane in a first flight pattern at an altitude less than approximately fifty thousand feet (50,000) to provide continuous coverage over a designated geographic area through a first communications link;

flying a second airplane up to a predetermined flight pattern having a predetermined altitude less than approximately fifty thousand feet (50,000) to establish a second communications link over the designated geographic area;

moving calls carried on the first communications link to the second communications link according to predetermined switchover protocol; and flying the first airplane out of the first flight pattern after all of the calls have been switched over to the second communication link.

17. The method of claim 16, wherein the moving of calls is a ground control-based operation.

18. The method of claim 16, wherein the moving of calls is a power control-based operation in which power of the first communications link is gradually reduced to enable calls on the first communications link to be gradually handed off to the second communications link.

19. The method of claim 16, wherein the moving of calls is a split spectral resources-based operation in which a percentage of spectral resources assigned to the second communications link is gradually increased until 100% of all spectral resources are assigned to the second communications link.

20. A method of providing cellular communications coverage using an airplane based antenna array, comprising:

establishing cellular communications coverage over a predetermined geographic area via a first generally circular flight pattern with an outer point thereof being tangential to a circumscribing flight pattern circle having a radius larger than that of the first flight pattern;

if a weather pattern affects the communications coverage, moving from the first flight pattern along the circumscribing flight pattern circle until a new operating point corresponding to a point of an alternate flight pattern that is tangential to the circumscribing flight pattern is reached; and executing the alternate flight pattern having a radius similar to the first flight pattern to maintain the cellular communication coverage over the predetermined geographic area.

21. The method of claim 20, further comprising adjusting the cellular communications coverage during the moving from the first flight pattern to maintain the cellular communications coverage over the predetermined geographic area.

22. The method of claim 21, wherein the moving from the first flight pattern further comprises at least one of turning beams providing the cellular communications coverage on/off and re-shaping the beams providing the cellular communications coverage.

23. The method of claim 20, wherein the moving from the first flight pattern is an airplane-based function.

24. The method of claim 20, wherein the moving from the first flight pattern is a terrestrial-based function.

* * * * *